United States Patent [19]

Erickson et al.

[11] Patent Number: 4,645,374
[45] Date of Patent: Feb. 24, 1987

[54] PANEL AND CONNECTOR ASSEMBLY

[76] Inventors: Arvid L. Erickson, 21365 Hamburg Ave., Lakeville, Minn. 55044; Scott G. Erickson, 1017 Woodhill Cir., Dixson, Ill. 61021

[21] Appl. No.: 825,073
[22] Filed: Jan. 31, 1986
[51] Int. Cl.⁴ .......................... B25G 3/36; E04G 7/00
[52] U.S. Cl. .................................... 403/402; 403/403; 52/282
[58] Field of Search ............... 403/294, 402, 403, 401, 403/293; 52/282, 281

[56] References Cited

U.S. PATENT DOCUMENTS

| | | |
|---|---|---|
| 226,509 | 4/1880 | Fletcher . |
| 238,114 | 2/1881 | Harris . |
| 691,049 | 1/1902 | D'Espine . |
| 869,055 | 10/1907 | Burroughs . |
| 1,126,351 | 1/1915 | Beabes . |
| 1,537,678 | 5/1925 | Jensen . |
| 1,888,523 | 11/1932 | Williamson . |
| 2,219,723 | 10/1940 | Mulderink et al. . |
| 2,249,028 | 7/1941 | Mulderink . |
| 2,398,603 | 4/1946 | Soderberg . |
| 3,200,913 | 8/1965 | Nelson . |
| 3,253,847 | 5/1966 | Webster . |
| 3,323,819 | 6/1967 | Barker . |
| 3,345,715 | 10/1967 | Lambert . |
| 3,467,423 | 9/1969 | Schlegel, Jr. et al. . |
| 4,032,241 | 6/1977 | Martin . |
| 4,050,498 | 9/1977 | Lucchetti . |
| 4,261,148 | 4/1981 | Scott . |
| 4,290,371 | 9/1981 | Snitzer et al. . |
| 4,438,578 | 3/1984 | Logan . |

FOREIGN PATENT DOCUMENTS 996754  2/1983  U.S.S.R. ............................... 403/403

OTHER PUBLICATIONS

Brochure, Erickson Wood Products, Inc., Lakeville, MN 55044.

Primary Examiner—Andrew V. Kundrat
Attorney, Agent, or Firm—Burd, Bartz & Gutenkauf

[57] ABSTRACT

A fixture having a plurality of upright panels and a top joined together with connectors. Adjacent edges of the panels have complimentary beveled faces and aligned grooves extended normal to the beveled faces. The connectors have flat webs located in surface engagement with the beveled faces of adjacent panels. Flanges joined to the outer end of the webs engage the panels and cooperate with lips joined to the inner end of the web located in the grooves to hold the panels in a structurally stable and tight sealed engagement with each other.

22 Claims, 8 Drawing Figures

PANEL AND CONNECTOR ASSEMBLY

FIELD OF INVENTION

The invention relates to structural joints for connecting adjacent panels together. The structure joints have dowels, connectors and locking elements to secure meeting ends of adjacent edges of panels together.

BACKROUND OF INVENTION

Numerous joint structures and connectors have been used to join adjacent panels together. These structures include dowels, pins, clips, wood strips, and metal extrusions. Examples of structural joints for panels are disclosed by Williamson in U.S. Pat. No. 1,888,523; Barker in U.S. Pat. No. 3,323,819; and Logan in U.S. Pat. No. 4,438,578. Williamson discloses a structural joint comprising a generally L-shaped locking strip having bent longitudinal ends. The locking strip fits into linear grooves of adjacent panels to hold adjacent mitered edges of the panels together. Barker discloses a joinder 10 described as a symetrical L-bar located between bent end flanges of normally disposed panels. A pair of cylindrical wedges cooperate with the joinder to hold the panels in assembled relation with each other. Logan discloses right angle bracket adapted to fit into channels in adjacent beveled ends of a frame structure. The outer ends of the bracket have bent over portions that fit into cavities in the channels.

SUMMARY OF INVENTION

The invention is directed to an apparatus for securing adjacent edges of panels together in a manner which provides a sturdy and structural stable connection. The panels are provided with beveled edges with each panel having at least one normally extended groove. Connectors locked onto the adjacent edges of the panels holds the ends of the panels in a tight sealed relationship. The connectors are mounted on panels with a minimum of labor and time and without the use of special tools. The connectors form corners of a structure, such as a fixture, made up of a number of connected panels. The connectors have convex curved outer apexes and flanges that protect the corners of the structure and eliminate any sharp or abrupt edges.

The preferred form of the panel and connector assembly has a first panel with inner and outer surfaces extended into an end having a first beveled face. A groove is located normally to the beveled face adjacent the inner surface. A second panel having inner and outer surfaces and a second beveled face complimentary to the first beveled face of the first panel. The second panel has a groove extended normal to the second beveled face adjacent the inner surface thereof. A connector is used to join the first panel to the second panel. A connector has a generally flat web located between and in surface engagement with the first and second beveled faces. A lip joined to the web extends into the grooves. Flange means joined to the outer edge of the web is engageable with the panels so that the lip and flange means hold the first and second faces in tight surface engagement with the web and fix the angular relationship between the first and second panels. Flange means extends at an angle relative to the lip to provide a hooked grip and tight sealed joint between adjacent ends of the panels.

In one form of the invention, the connector has a generally flat web provided with an inner edge and an outer edge. A flat lip is joined to the inner edge and extends normally in opposite outward directions from the web. A pair of flanges are joined to the outer edge of the web with a nose portion having a convex curved outer surface. The flanges are normally disposed relative to each other and have a length greater than the length of the lip. When the connector is in assembled relation with the panel, the flanges are in tight surface engagement with the outer surfaces of the panels and the beveled faces of the panels are located in tight surface engagement with the opposite flat sides of the web.

The panel and connector assembly of the invention is shown and described with use with a fixture for supporting merchandise. Other uses and advantages of the panel and connector are not precluded by this disclosure.

DESCRIPTION OF PREFERRED EMBODIMENTS

Figure 1:
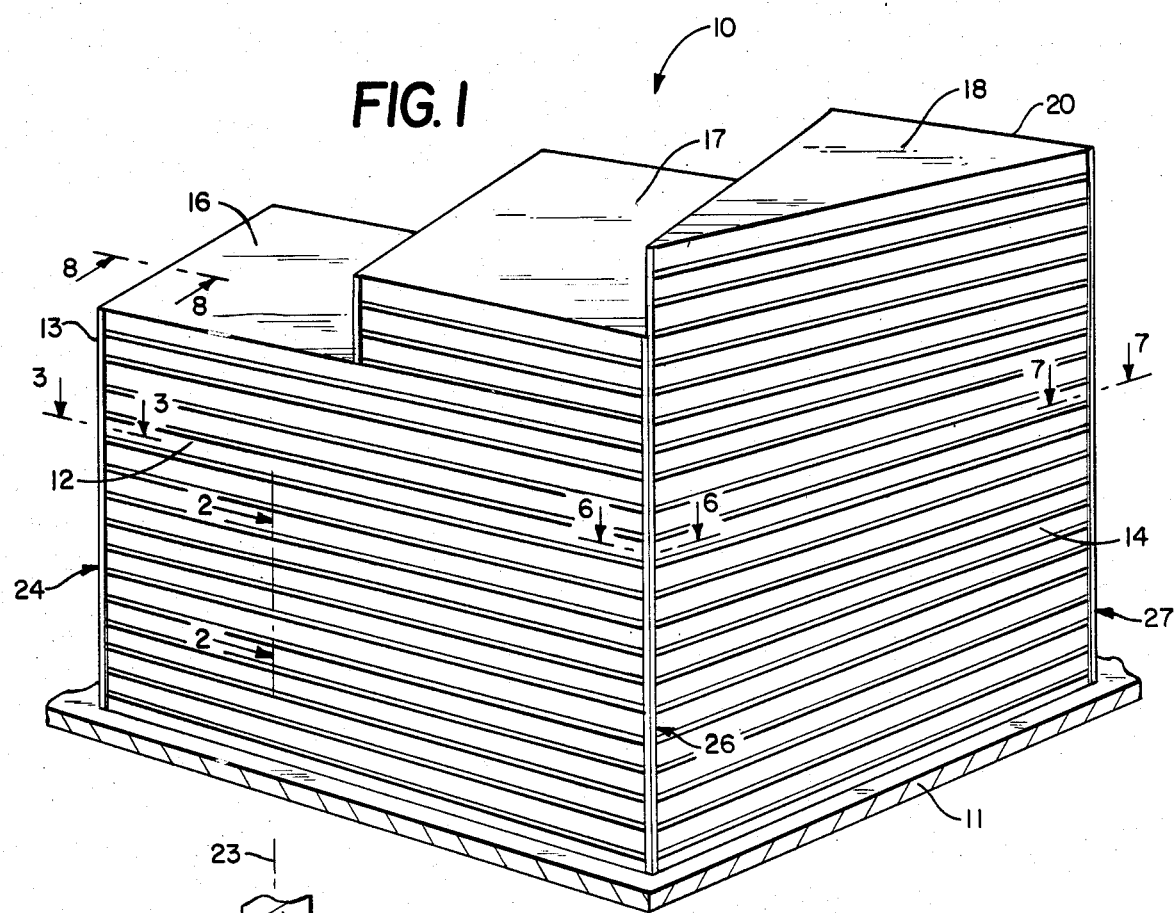
FIG. 1 is a perspective view of a fixture having the panels and connectors of the invention.

Referring to FIG. 1, there is shown a fixture indicated generally at 10 for displaying and supporting merchanidise, cash registers, and the like in a retail or commercial environment. Fixture 10 supported on floor 11 has a plurality of horizontally grooved panels comprising a front panel 12, side panels 13 and 14 and a rear panel 20. Top section 16, 17, and 18 located at separate elevations are attached to the front side, and rear panels 12, 13, 14 and 20.

Figure 2:
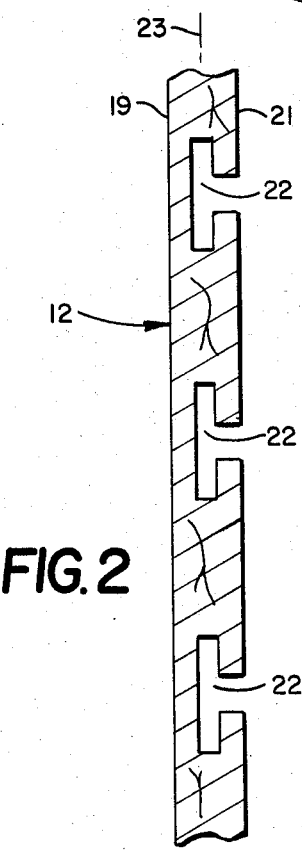
FIG. 2 is an enlarged sectional view taken along line 2—2 of FIG. 1.

Referring to FIG. 2, front panel 12 has a inner continuous surface 19 and an outer surface 21. The outer surface 21 is interrupted with a plurality of vertically spaced horizontal T grooves 22. The cross portions or heads of the T grooves 22 are located along the center line 23 of panel 12. All of panels 12-14 have generally horizontal T grooves. The T grooves are preferably spaced three inches from center to center. The T grooves run the length of the panels. Alternate T groove spacing can be made on 2, 4, 6, and 8 inch centers. Panels 12-14 and top 16-18 may be made of wood, plastic, plastic and wood laminates and metal. The outer surfaces of the panels may be painted, unfinished, mirrored and/or wood veneered. The panels may have a fiberboard core and a veneer outer face. The panels can be used for wall displays, free standing fixtures, as shown in FIG. 1. A variety of brackets, hangers, and shelving (not shown) made of wood, metal or plastic are used with the panels to display merchandise. The supports have generally hook-shaped heads that fit into the T grooves to attach the supports to the panels.

Figure 3:
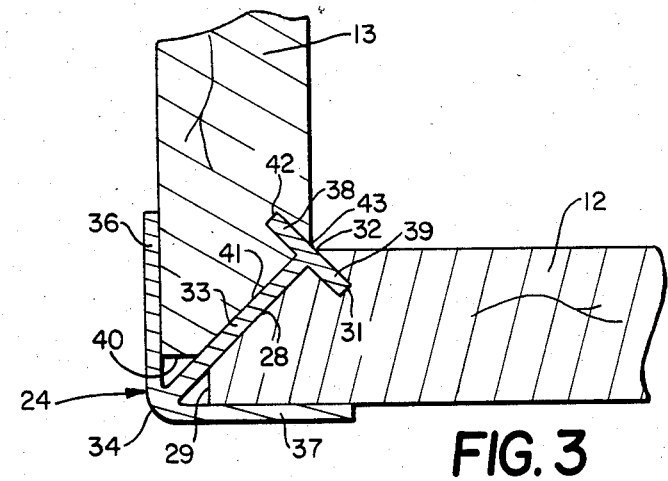
FIG. 3 is an enlarged sectional view taken along line 3—3 of FIG. 1.

As shown in FIGS. 1 and 3, a generally vertical connector indicated generally at 24 couple the adjacent ends of the panels 12 and 13. A connector indicated generally at 26 joins the opposite edge of panel 12 to side panel 14. A connector 27 joins side panel 14 to back panel 20.

Figure 4:
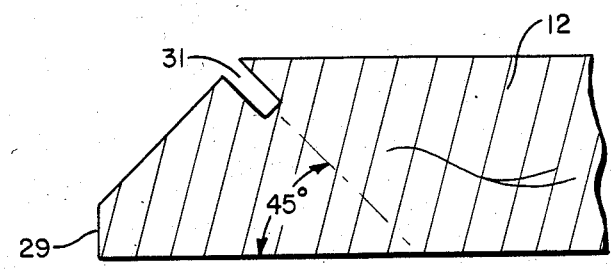
FIG. 4 is a sectional view of an end of a panel tapered and grooved to accommodate a connector.

Referring to FIG. 4, there is shown a cross section of an end of panel 12 shaped to accommodate connector 24. Panel 12 has a beveled or tapered end face 28 and a transverse outer corner 29. End face 28 has a 45 degree angle to form a right angle corner of fixture 10. The inner end of surface 28 is interrupted with a groove 31. Groove 31 projects normal to the plane of face 28 and is at an angle of 45 degrees with respect to the outer surface 21. Groove 31 forms with inner surface 19 and edge 32. The groove 31 has a generally rectangular cross section that extends the length of the end of panel 12. Groove 31 is formed with a circular saw or router bit. Other cutting tools and combination of tools can be used to cut groove 31 and face 28. The end face 28 and groove 31 can be simultaneously made with a combined plane and saw tool. The beveled face 41 and groove 42 is made in panel 13 in the same manner.

Figure 5:
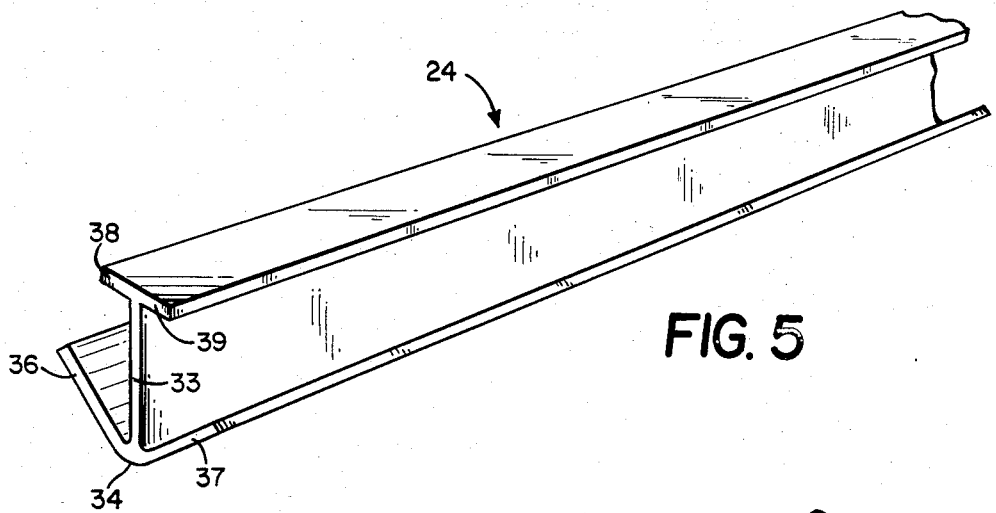
FIG. 5 is a foreshortened perspective view of the connector of FIG. 3.

Referring to FIG. 5, there is shown connector 24 comprising a flat linear web 33 joined to a convex curved nose or apex 34. Web 33 has opposite flat surfaces that extend the length of connector 24. Outwardly directed flat flange 36 and 37 are joined to opposite sides of nose 34. The flanges 36 and 37 are normally disposed relative to each other. Web 33 bisects the angle between flanges 36 and 37. The inner end of web 33 is joined to lips 38 and 39. The lips 38, 39 extend in opposite directions from web 33 and are noramlly disposed relative to web 33. Lips 38 and 39 are shorter than the flanges 36 and 37 and are disposed at an angle of 45 degrees relative to the longitudinal planes of flanges 36 and 37. Connector 24 can be a metal extrusion, plastic, wood and like structural material. An example of connector 24 is a metal extrusion having a flat web with a transverse dimension of the faces on the ends of the panels. The lip 39 has a transverse dimension of 1.27 cm and projects normally from opposite sides of web 33. The flanges 36 and 37 each have a length of 1.90 cm and are located at right angles relative to each other.

Referring to FIG. 3, connector 24 is located in assembled relation with the adjacent ends of panels 12 and 13 to retain the panels in fixed relation relative to each other. Panel 13 has a flat angularly inclined end surface 41 and a groove 42 at the inner end thereof. The groove 42 forms a transverse edge 43 on the inside of panel 13. Edge 32 of panel 12 and edge 43 of panel 13 face each other to form the inside corner of the fixture. Web 33 is located in tight surface engagement with end surfaces 28 and 41. Flange 36 is located in surface engagement with the outside of the panel 13. Flange 37 is located in surface engagement with the outside of panel 12. The outer corners 29 and 40 of panels 12 and 13 are transversely cut off to prevent jaming of material in the inside corners of connector 24. This ensures tight surface engagement of faces 28 and 41 against web 33. Lips 38 and 39 are located in grooves 42 and 31 respectively. Lips 48 and 39 being located at an angle relative to the length of panels 12 and 13 hold or locks the panels in assembled relation with connector 24. Lip 38 holds surface 41 and outside surface of panel 13 in tight surface engagement with web 33 and flange 36. Lip 39 holds the end surface 28 of panel 12 and outer surface of panel 12 in tight surface engagement with web 33 and flange 37. Lip 38 extending across the inside corner of panels 12 and 13, the flat tight surface engagement of the ends of the panels with web 33, and the surface engagement of flanges 36 and 37 with the outside of panels 13 and 12 provide a hooked grip and tight sealed joint between adjacent ends of panels 12 and 13. Flanges 36 and 37 with convex nose 34 protects the outer surfaces of panels 12 and 13 located adjacent the joint. Special tools are not required to assembly connector 24 on adjacent panels 12 and 13. Additional parts and adhesives are not used to provide a tight structurally stable joint securing adjacent ends of panels together.

Figure 6:
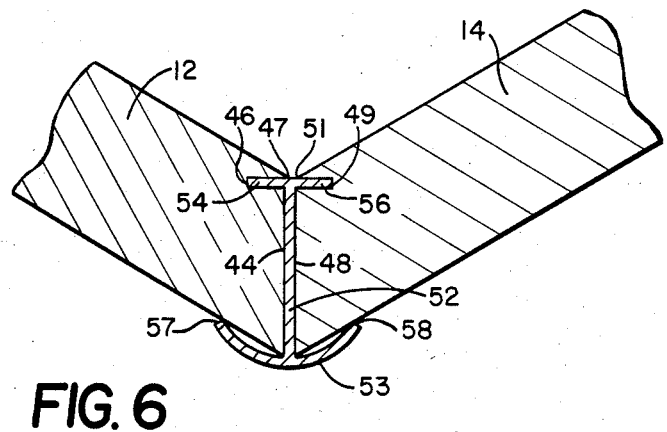
FIG. 6 is an enlarged sectional view taken along line 6—6 of FIG. 1.

Referring to FIG. 6, there is shown connector 27 joining panel 12 to panel 14. Panel 12 has a flat beveled end face 44 and a groove 46 in the inner end thereof. Groove 46 is normal to end face 44. Groove 46 forms with the inner surface of panel 12 an inner edge 47. Panel 14 has a beveled or angled flat end face 48 having a groove 49 at the inner end thereof. Groove 49 is aligned with groove 46. Groove 49 forms with the inner surface of panel 14 and edge 51. Edges 47 and 51 are adjacent each other to form the inside corner of joined panels 12 and 14. Connector 26 has a flat web 52 located in surface engagement with the flat end faces 44 and 48. A web 52 extends the full length and width or transverse dimension of faces 44 and 48 and is joined to an outer convex curved flanges or head 53. The head 53 extends over the outside surfaces of panels 12 and 13 and has outer edges 57 and 58 that engage panels 12 and 14. The inner end of web 52 is joined to lips 54 and 56 extended into grooves 46 and 49. Lips 54 and 56 in conjunction with head 53 provide a hooked grip on panels 12 and 14 which holds web 52 in tight surface engagement with end faces 44 and 48 of panels 12 and 14.

Figure 7:
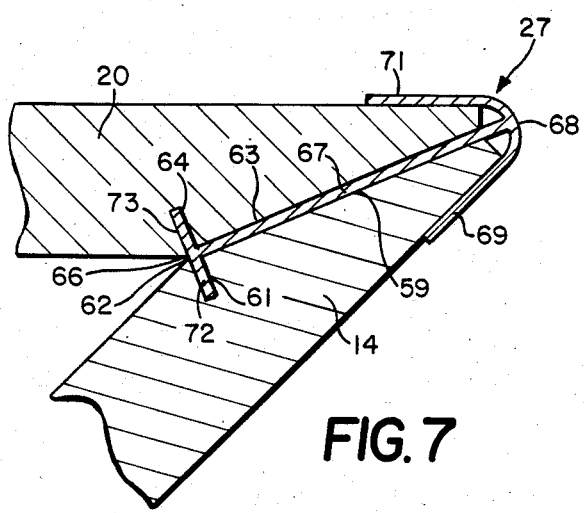
FIG. 7 is an enlarged sectional view taken along line 7—7 of FIG. 1.

Referring to FIG. 7, there is shown connector 27 holding panel 14 in assembled relation with back panel 20. Panels 14 and 20 are at an acute angle relative to each other. Panel 14 has a beveled or angled end face 59 and a groove 61 at the inner end thereof. Groove 61 is normal relative to end face 59. The inner surface of panel 14 has an edge 62 adjacent groove 61. Panel 20 has a beveled angled end face 63 and a groove 64 aligned with groove 61. The inside surface of panel 20 has an edge 66 at the outer end of groove 64. Edges 62 and 66 face each other when panels 14 and 20 are assembled together with connector 27.

Connector 27 has a flat web 67 that extends the length and width or transverse dimension end faces 59 and 63. The outer end of web 67 is joined to a convex curved nose 68. A pair of flat flanges 69 and 71 are joined to opposite sides of nose 61. Flanges 69 and 71 are located in surface engagement with the outside faces of the panels 14 and 20. Flanges 69 and 71 are angularly disposed relative to each other at the acute angle of the corner formed by panels 14 and 20.

Figure 8:
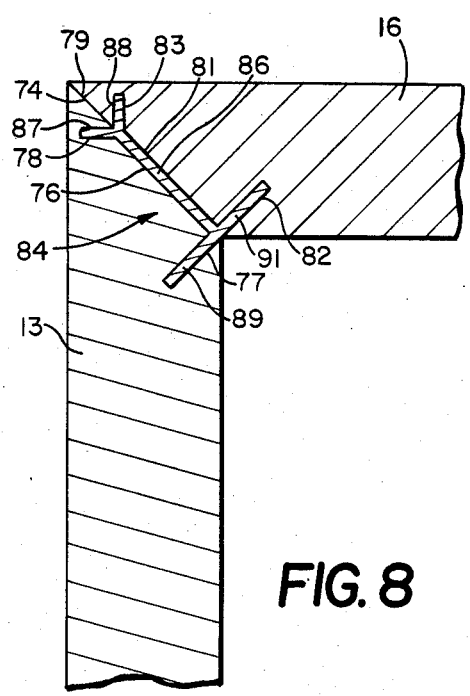
FIG. 8 is an enlarged sectional view taken along line 8—8 of FIG. 1.

Referring to FIG. 8, there is shown the connector indicated generally at 84 for joining top 16 to side panel 13. Side panel 13 has top edge faces 74 and 76 and a pair of grooves 77 and 78. Groove 78 extends in a transverse direction relative to the length of panel 13. Groove 77 is normal to the edge face 76.

Top 16 has end faces 79 and 81 and a pair of grooves 82 and 83. Groove 83 is normal to the length of top 16. Groove 82 is normal to the end face 81. Grooves 77 and 82 are located adjacent the inside surfaces of panel 13 and top 16.

Connector 84 has a generally flat web 86 that extends linearly along the length of top 16. The web 86 has opposite flat faces located in surface engagement with end face 76, panel 13 and the edge face 81 of top 16. End faces 74 and 79 are retained in firm surface engagement with each other by connector 84. Web 86 is joined to a pair of flanges 87 and 88 that extend into grooves 78 and 83. Flanges 78 and 88 are normal relative to each other and have obtuse angles relative to the plane of web 86. The inner end of web 86 has a pair of lips 89 and 91 extended into grooves 77 and 82. Lips 89 and 91 are normally disposed relative to the plane of web 86.

The top edge of side panel 13 is formed with the planar which steps faces 74 and 76. Cutting tools, such as a saw or router bits are used to form grooves 77 and 78. The end faces 79 and 81 in top 16 as well as the grooves 82 and 83 are formed in a similar manner. The top 16 is held in normal relation relative to side panel 13 with end faces 74 and 79 in engagement with each other. Connector 84 is linearly moved into the grooves 78, 83, 82, and 77. The entire length of top 16, 17 and 18 can be connected to their adjacent panels with a connector similar to connector 84.

While there has been shown and described preferred embodiments of the connectors for fabricating the fixture 10, it is understood that changes in materials, and modifications of the panels and connector structures can be made by those skilled in the art without departing from the invention. The invention is defined in the following claims.

The embodiments of the invention in which an exclusive property or privilege is claimed are defined as follows:

1. A panel and connector assembly comprising: a first panel having an outer surface, an inner surface, an end with a first beveled face extended from the inner surface toward the outer surface thereof, and a groove extended normal to said first beveled face adjacent the inner surface, a second panel having an outer surface, an inner surface, an end with a second beveled face extended from the inner surface toward the outer surface thereof, and a groove extended normal to said second beveled face adjacent the inner surface thereof, connector means joining said first panel to said second panel together in a fixed relationship relative to each other, said connector means having a flat web located between and in surface engagement with first and second beveled faces, lip means joined to said web extended into said grooves, and flange means joined to said web engageable with said first and second panels, said flange means comprising convex curved flanges joined to an outer edge of the web and extended in opposite directions therefrom at acute angles relative to said web, said flanges having outer edges located in engagement with the first and second panels whereby said lip means and flange means hold the faces in surface engagement with said web and fix the angular relationship between said first and second panels.

2. The assembly of claim 1 wherein: said lip means comprises generally flat lips joined to an inner edge of the web and extended normal to said web, said lips projected in opposite directions from said web.

3. The assembly of claim 1 wherein: said flanges comprise a first flange located in engagement with the outer surface of the first panel, and a second flange located in engagement with the outer surface of the second panel.

4. The assembly of claim 1 wherein: said first and second beveled faces have substantially the same transverse length, said web having a transverse length substantially the same as the transverse length of said first and second beveled faces.

5. The assembly of claim 4 wherein: said flange means has a transverse length longer than the transverse length of said lip means.

6. The assembly of claim 1 wherein: said first and second beveled faces have substantially the same transverse and longitudinal lengths, said web has a transverse dimension and a longitudinal length generally the same as the transverse dimension and longitudinal length of the first and second beveled faces, said web having an inner edge and an outer edge, said lip means comprise generally flat lips joined to an inner edge of the web and extended normal to said web.

7. The assembly of claim 6 wherein: said flanges comprise a first flange located in engagement with the outer surface of the first panel, and a second flange located in engagement with the outer surface of the second panel.

8. A panel and connector assembly comprising: a first panel having an outer surface, an inner surface, an end with a first beveled face extended from the inner surface toward the outer surface thereof, and a groove extended normal to said first beveled face adjacent the inner surface, a second panel having an outer surface, an inner surface, an end with a second beveled face extended from the inner surface toward the outer surface thereof, and a groove extended normal to said second beveled face adjacent the inner surface thereof, connector means joining said first panel to said second panel together in a fixed relationship relative to each other, said connector means having a flat web located between and in surface engagement with first and second beveled faces, lip means joined to said web extended into said grooves, and flange means joined to said web engageable with said first and second panels, said flange means being located in second grooves open to the faces of said panels whereby said lip means and flange means hold the faces in surface engagement with said web and fix the angular relationship between said first and second panels.

9. The assembly of claim 8 wherein: said lip means comprises generally flat lips joined to an inner edge of the web and extended normal to said web, said lips projected in opposite directions from said web into said first grooves.

10. The assembly of claim 8 wherein: said flange means comprises flanges joined to an outer edge of the web and extended in opposite directions therefrom into said second grooves.

11. The assembly of claim 10 wherein: said flanges comprise a first flange located in one of said second grooves, and a second flange located in the other of said second grooves.

12. The assembly of claim 8 wherein: said first and second beveled faces have substantially the same transverse and longitudinal lengths, said web has a transverse dimension and a longitudinal length generally the same as the transverse dimension and longitudinal length of the first and second beveled faces, said web having an inner edge and an outer edge, said lip means comprise generally flat lips joined to an inner edge of the web and extended normal to said web, said flange means comprise flanges joined to said outer edge of the web and extended in opposite directions therefrom at obtuse angles relative to the plane of said web.

13. A panel and connector assembly comprising: a first panel having an outer surface, an inner surface, and an end with a first transverse surface located adjacent the outer surface and a first beveled face extended from the first transverse surface to the inner surface thereof, and a groove extended normal to said first beveled face adjacent the inner surface of the panel, a second panel having an outer surface, an inner surface, and an end with a second transverse surface extended from the outer surface and a second beveled face extended from the transverse surface toward the inner surface thereof, and a groove extended normal to said second beveled face adjacent the inner surface thereof, connector means joining said first and second panels together in a fixed relationship relative to each other, said connector means having a flat web located between and in surface engagement with the first and second beveled faces, generally flat lip means joined to an inner edge of the web and extended into said grooves, and flange means joined to the outer edge of the web engageable with the outer surfaces of the first and second panels whereby the lip means and flange means hold the faces of the panels in tight surface engagement with said web and fix the angular relationship between first and second panels.

14. The assembly of claim 13 wherein: said flange means extend in opposite directions at acute angles relative to the said web.

15. The assembly of claim 13 wherein: said flanges comprise a first flange located in surface engagement with the outer surface of the first panel, and a second flange located in surface engagement with the outer surface of the second panel, and nose means having a convex curved outer surface joined to said first and second flanges and said web.

16. The assembly of claim 13 wherein: said flange means comprises convex curved flanges having outer edges located in engagement with the first and second panels.

17. The assembly of claim 13 wherein: said first and second beveled faces have substantially the same transverse length, said web having a transverse length substantially the same as the transverse length of said first and ssecond faces.

18. The assembly of claim 17 wherein: said flange means have a transverse length longer than the transverse length of the lip means.

19. An assembly of claim 13 wherein: said first and second beveled edges have substantially the same transverse and longitudinal lengths, said web having a transverse dimension and a longitudinal length generally the same as the transverse dimension and longitudinal length of the first and second beveled faces, said web having an inner edge and an outer edge, said lip means comprise gnerally flat lips joined to the inner edge of the web and extended in opposite directions normal to said web, said flange means comprise first and second flanges joined to said outer edge of the web and extended in opposite directions therefrom at an acute angle relative to said web.

20. The assembly of claim 19 wherein: said first and second flanges are located in surface engagement with the outer surfaces of said first and second panels.

21. The assembly of claim 20 wherein: said first and second flanges are normally disposed relative to each other.

22. The assembly of claim 20 wherein: said first and second flanges are located at an acute angle relative to each other.

* * * * *